(12) United States Patent
Lin et al.

(10) Patent No.: US 12,244,061 B2
(45) Date of Patent: *Mar. 4, 2025

(54) RADAR SYSTEM WITH REDUCED TRANSMITTER ANTENNA AND RECEIVER ANTENNA MUTUAL COUPLING

(71) Applicant: Airtouch (Shanghai) Intelligent Technology Co., Ltd, Shanghai (CN)

(72) Inventors: Zheng Lin, Shanghai (CN); Qiushi Lei, Shanghai (CN); Hede Kuan, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,079

(22) Filed: Aug. 1, 2022

(65) Prior Publication Data

US 2023/0040629 A1 Feb. 9, 2023

(30) Foreign Application Priority Data

Aug. 3, 2021 (CN) .......................... 202110883911.3
Aug. 3, 2021 (CN) .......................... 202121791013.7

(51) Int. Cl.
*H01Q 1/52* (2006.01)
*G01S 7/03* (2006.01)
*H01Q 9/04* (2006.01)
*H01Q 15/00* (2006.01)

(52) U.S. Cl.
CPC ......... *H01Q 15/0013* (2013.01); *G01S 7/038* (2013.01); *H01Q 1/525* (2013.01); *H01Q 9/0407* (2013.01)

(58) Field of Classification Search
CPC ......... G01S 13/003; G01S 7/038; H01Q 1/52; H01Q 1/521; H01Q 1/523; H01Q 1/525; H01Q 1/526; H01Q 1/528
See application file for complete search history.

(56) References Cited

U.S. PATENT DOCUMENTS

| 2012/0190296 A1* | 7/2012 | Sarabandi | .......... H04B 7/15564 343/893 |
| 2016/0141748 A1* | 5/2016 | Tagi | ....................... H01Q 1/521 342/175 |

* cited by examiner

*Primary Examiner* — Daniel Munoz

(57) ABSTRACT

Embodiments of the disclosure include a Radio Detection and Ranging (Radar) system with reduced transmitter antenna and receiver antenna mutual coupling. The radar system includes a transmitter antenna disposed on a first side of the dielectric substrate and a receiver antenna disposed on the same side of the dielectric substrate. The radiation boundaries of the transmitter antenna and the receiver antenna are substantially parallel to a line connecting centroids of the transmitter antenna and the receiver antenna. The radar system also includes a ground plane disposed on a second side of the dielectric substrate, opposite to the first side, operatively connected to the transmitter antenna and the receiver antenna through probes. The ground plane comprises at least one groove, separating vertical projections of the transmitter antenna and the receiver antenna on the ground plane.

20 Claims, 10 Drawing Sheets

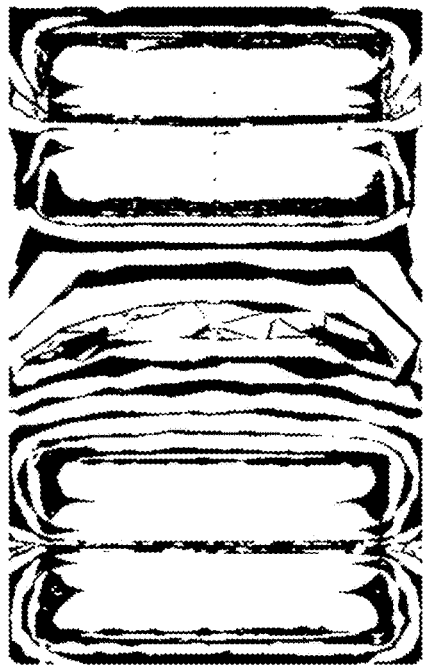
FIG. 4B
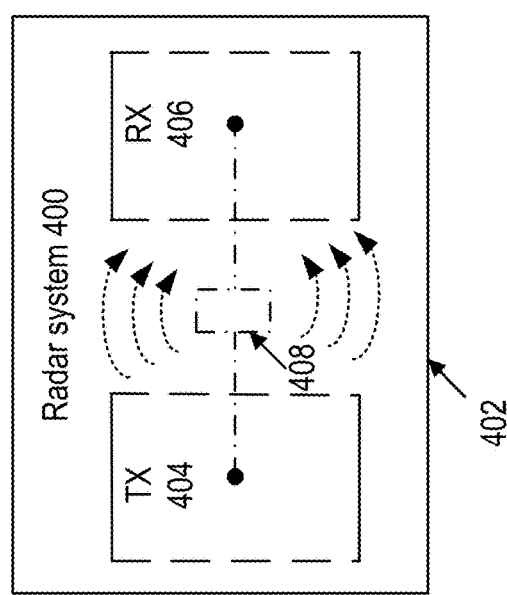
FIG. 4A
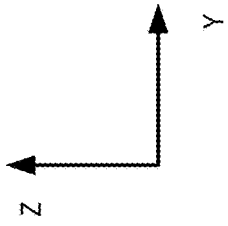

FIG. 5B
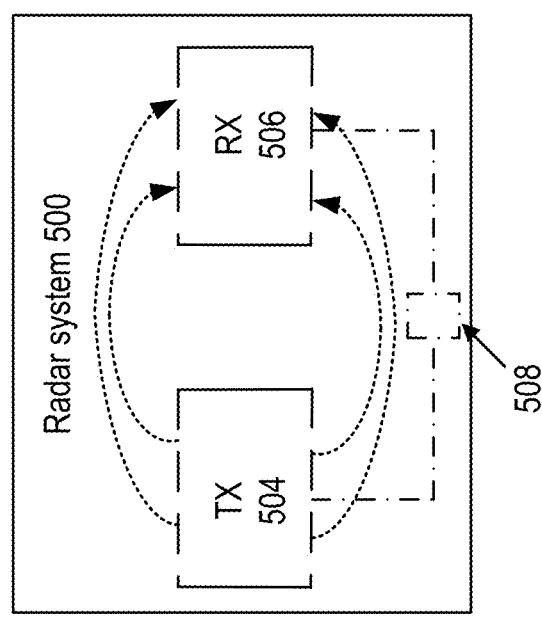
FIG. 5A
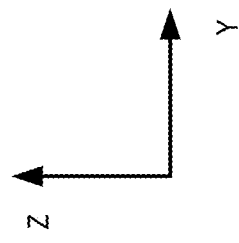

RADAR SYSTEM WITH REDUCED TRANSMITTER ANTENNA AND RECEIVER ANTENNA MUTUAL COUPLING

CROSS-REFERENCE TO RELATED APPLICATION

This application claims the benefit of priority to Chinese Patent Application No. 2021108839113 filed on Aug. 3, 2021, and Chinese Patent Application No. 2021217910137 filed on Aug. 3, 2021, which are incorporated herein by reference in its entirety.

TECHNICAL FIELD

The present disclosure relates to a Radio Detection and Ranging (Radar) system, and more particularly to, a Radar system with reduced mutual coupling between transmitters and receivers.

BACKGROUND

Radio detection systems such as Radar systems have been widely used in advanced detection technologies, such as to detect the existence of the objects/human beings and/or determine the properties of the same. For example, a typical Radar system measures the property (e.g., velocity, location, micro movement, etc.) of a target by reflecting off the target with electromagnetic waves (e.g., pulsed or continuous electromagnetic waves) and measuring the returned electromagnetic waves with a receiving antenna. Differences in the returned electromagnetic wave's return times, wavelengths, frequencies, and/or phases can then be used to determine the properties of the target. Because radio waves (long wavelength electromagnetic waves) can penetrate different mediums (e.g., clouds, fogs, mist, etc.), target multiple objects simultaneously, and can have high sensitivity at low cost, a Radar system is particularly suitable for applications such as detecting vehicles, sensing parking spaces, or for more delicate tasks such as monitoring human activities/micro movements in aiding home automations.

To perform the measurement, a Radar system includes many key components such as transmitter(s) (e.g., transmitting antennas), receiver(s) (e.g., receiving antennas), power supplier(s), controller(s), to name a few. Because the Radar system detects objects by illuminating the objects (i.e., transmitting electromagnetic waves to the objects and detecting the returned electromagnetic waves reflected by the objects), higher Radar sensitivity calls for higher electromagnetic emitting power of the transmitter and higher detecting sensitivity of the receiver.

However, in the consumer-grade Radar applications such as in aiding home automations where a Radar system are used to monitor the human being's activities or even micro movements, the Radar systems can only take limited space for packaging while having high sensitivity at the same time. Those requirements are contradicting because being placed closely (e.g., packed in a limited space) means the transmitter and the receiver of the Radar system may have to be deposed in the near-field zone of one another where mutual coupling may happen through the surface/space-waves and near fields. This can greatly reduce the signal-to-noise ratio (SNR) and thus lead to significantly degradation to the radiation characteristics of the Radar system.

Embodiments of the disclosure address the above problems by Radar systems with reduced transmitter antenna and receiver antenna mutual coupling.

SUMMARY

In one example, embodiments of the disclosure include a Radio Detection and Ranging (Radar) system with reduced transmitter antenna and receiver antenna mutual coupling. The radar system includes a transmitter antenna disposed on a first side of the dielectric substrate and a receiver antenna disposed on the same side of the dielectric substrate. The radiation boundaries of the transmitter antenna and the receiver antenna are substantially parallel to a line connecting centroids of the transmitter antenna and the receiver antenna. The radar system also includes a ground plane disposed on a second side of the dielectric substrate, opposite to the first side, operatively connected to the transmitter antenna and the receiver antenna through probes. The ground plane includes at least one groove, separating vertical projections of the transmitter antenna and the receiver antenna on the ground plane.

In another example, embodiments of the disclosure include an apparatus for radio detection with reduced mutual coupling between transmitters and receivers. The apparatus includes a dielectric substrate. The dielectric substrate includes a transmitter antenna disposed on a first side of the dielectric substrate. The dielectric substrate also includes a receiver antenna disposed on the first side of the dielectric substrate, wherein the radiation boundaries of the transmitter antenna and the receiver antenna are substantially parallel to a line connecting centroids of the transmitter antenna and the receiver antenna. The dielectric substrate further includes a plurality of frequency-selective surface (FSS) units separating the transmitter antenna and the receiver antenna, configured to reduce mutual coupling between the transmitter antenna and the receiver antenna by suppressing an operating frequency of the transmitter antenna and the receiver antenna. The plurality of FSS units are substantially co-planar to the transmitter antenna and the receiver antenna on the first side of the dielectric substrate. The apparatus also includes a ground plane disposed on a second side of the dielectric substrate, opposite to the first side, operatively connected to the transmitter antenna and the receiver antenna through probes.

In a further example, embodiments of the disclosure include a method for radio detection using a Radar system with reduced transmitter antenna and receiver antenna mutual coupling. The method includes emitting radio signals to an environment surrounding the Radar system, by a transmitter antenna disposed on a first side of a dielectric substrate. The method also includes detecting, by a receiver antenna disposed on the same side of the dielectric substrate, returned radio signals from the environment. The radiation boundaries of the transmitter antenna and the receiver antenna are substantially parallel to a line connecting centroids of the transmitter antenna and the receiver antenna. The transmitter antenna and the receiver antenna are separated by a plurality of frequency-selective surface (FSS) units, configured to reduce mutual coupling between the transmitter antenna and the receiver antenna by suppressing an operating frequency of the transmitter antenna and the receiver antenna, and wherein the plurality of FSS units are substantially co-planar to the transmitter antenna and the receiver antenna on the first side of the dielectric substrate.

It is to be understood that both the foregoing general description and the following detailed description are exemplary and explanatory only and are not restrictive of the invention, as claimed.

BRIEF DESCRIPTION OF THE DRAWINGS

FIG. 4A illustrates a top view of an exemplary conventional Radar system and FIG. 4B illustrates a top view of simulation results of mutual coupling between the transmitter antenna and the receiver antenna of the Radar system according to embodiments of the present disclosure.

FIG. 5A illustrates a top view of an exemplary Radar system with reduced transmitter antenna and receiver antenna mutual coupling and FIG. 5B illustrates a top view of simulation results of the direct radio transmission between the transmitter antenna and the receiver antenna of the Radar system with reduced transmitter antenna and receiver antenna mutual coupling, according to embodiments of the present disclosure.

DETAILED DESCRIPTION

Figure 1:
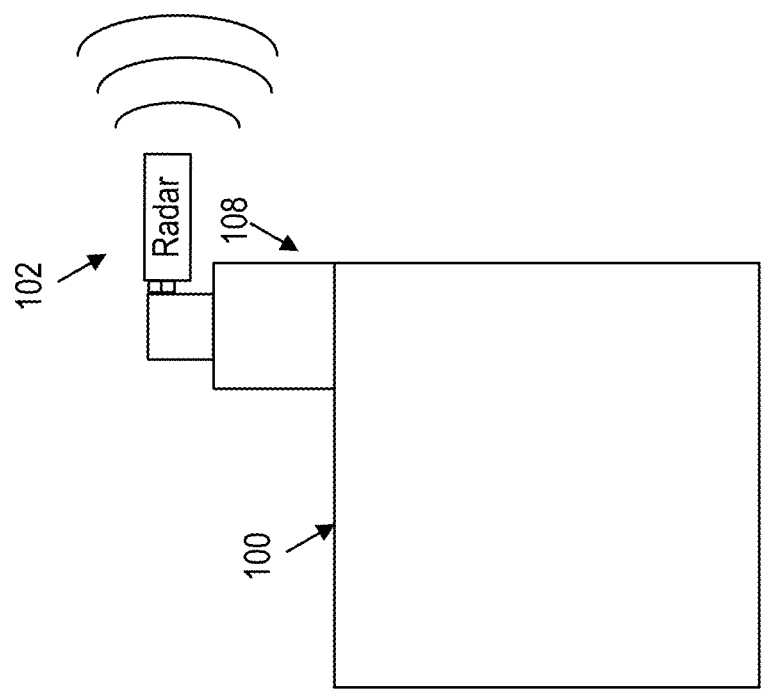
FIG. 1 illustrates a schematic diagram of an exemplary smart device equipped with a Radar system with reduced transmitter antenna and receiver antenna mutual coupling, according to embodiments of the present disclosure.

Reference will now be made in detail to the exemplary embodiments, examples of which are illustrated in the accompanying drawings. Wherever possible, the same reference numbers will be used throughout the drawings to refer to the same or like parts.

The radio detection system (e.g., a Radar system) may be used to detect objects. Besides the common application of the detecting result, such as the speed and/or location of a vehicle, the vacancy of a parking spot, etc., the detecting result can also be used for human activities monitoring, such as detecting the existence of a human being and/or the micro movements (e.g., the pulse, the heartbeat, the breath) of a human being. For example, the radio detection system may include a transmitter (e.g., a transmitter antenna) configured to emit electromagnetic waves (e.g., continue or pules) to illuminate the environment around the radio detection system and may also include a receiver (e.g., a receiving antenna) configured to receive the returned electromagnetic waves reflected by the objects. The radio detection system may further include a control module and a processing module configured to control the emitting and receiving of the electromagnetic waves and processing the received electromagnetic waves respectively. Based on analyzing the frequency difference of the emitted electromagnetic waves and the received electromagnetic waves (e.g., according to Doppler shift), the moving speed and/or the micro movements of a living being can be determined.

When packaging a radio detection system, the transmitter and the receiver are usually disposed on the same side of a dielectric substrate (e.g., a printed circuit board (PCB)) and are disposed close to each other because of the packaging space limitation. However, the limitation in the size of the packaging, and the requirement of high transmit power and receiving sensitivity would cause significant interference problem. Specifically, besides the electromagnetic waves emitted to and returned from the environment around the radio detection system, electromagnetic waves may also be directly transmitted from the transmitter to the receiver (e.g., through mutual coupling such as the surface wave on the substrate's surfaces, space-waves, and/or near fields of the transmitter/receiver). Those electromagnetic waves are interfering signals/noises because they include no information regarding the environment around the radio detection system. Those noises would interfere with the detection by lowering the signal-to-noise ratio (SNR) and degrading the radiation characteristic of the radio detection system. Accordingly, given the same amount of the effective radiation power (e.g., the power of the electromagnetic waves emitted to and returned from the environment around the radio detection system), the lower amount of the mutual coupling (e.g., directly transmitted electromagnetic waves) between the transmitters and the receivers, the better sensitivity the radio detection system would have.

As will be disclosed in detail below, the radio detection system (e.g., the Radar system with reduced transmitters and receivers mutual coupling) disclosed herein has applied different mechanisms to address the above-mentioned problems. In some embodiments, the transmitting antenna and the receiving antenna may be disposed on the same side of a dielectric substrate in a manner such that the radiation boundaries of the transmitter antenna (e.g., boundaries of the transmitter antenna that mostly emit the electromagnetic waves) and the receiver antenna (e.g., boundaries of the receiver antenna that mostly receive the electromagnetic waves) are substantially parallel to a line connecting centroids of the transmitter antenna and the receiver antenna. In other words, radiation boundaries of the transmitter antenna and the receiver antenna are substantially perpendicular to the direct transmission path (e.g., the surface/space waves on each side of the dielectric substrate where the transmitter antennas, receiver antennas, and the ground plane are disposed respectively) between the transmitter antenna and the receiver antenna. Accordingly, the transmission distance of the surface/space wave transmission on the dielectric substrate would be significantly extended. Longer transmission distance would cause the mutual coupling of the transmitter antenna and the receiver antenna to reduce exponentially, and by setting the radiation boundaries of the transmitter antenna and the receiver antenna to be substantially perpendicular to the direct transmission path between the transmitter antenna and the receiver antenna, the continuity of the direct transmission path would be disrupted or even cut off. Experiments show that the strength of the mutual coupling could reduce to 1/10 of the original mutual coupling strength without applying the mechanism.

In some other embodiments, on the same side of the dielectric substrate where the transmitter antenna and the receiver antenna are disposed, a plurality of Frequency Selective structure (FSS) units may be disposed separating the transmitter antenna and the receiver antenna. The central frequency of the band gap of each of the FSS unit is designed to be substantially equal to the operating frequency of the transmitter antenna and the receiver antenna. Accordingly, the surface/space wave transmission on the dielectric substrate would be suppressed (e.g., mostly absorbed and transformed into other form of energy such as heat or other mode of electromagnetic waves).

In some further embodiments, grooves/gaps may be fabricated on a ground plane (e.g., the ground plane disposed on the other side of the dielectric substrate, connected to the transmitted antenna and receiver antenna through probes). The gap surrounds at least one of the transmitter antenna or the receiver antenna, separating vertical projections of the transmitter antenna and the receiver antenna on the ground plane (e.g., vertical projections of the radiation boundaries of the transmitter antenna and the receiver antenna). This would significantly reduce the surface/space wave transmission on the ground plane by cutting off a large portion of the transmission path of the surface/space wave on the ground plane.

It is contemplated that the embodiments disclosed herein are not limited to implementing any of the individual mechanism or specific combinations of the mechanisms disclosed herein. Any possible combination (e.g., any two or all three) of the disclosed mechanisms or various modifications to the disclosed system and related methods should be apparent to those skilled in the art. Other embodiments will be apparent to those skilled in the art from consideration of the specification disclosed herein and practice of the system and related methods disclosed below.

It is intended that the specification and examples be considered as exemplary only, with a true scope being indicated by the following claims and their equivalents.

When being used in the above-mentioned applications (e.g., aid home automation by detecting human being's presence and/or micro movements), the radio detection system can be equipped on smart devices such as smart air conditioners, smart televisions (TVs), etc. The radio detection system can be used for detecting the existence of human beings and/or the condition of the human beings (e.g., the pulse, the heartbeat, the breath) where the detecting result can be used to control the device automatically. For example, FIG. 1 illustrates a schematic diagram of an exemplary smart device equipped with a Radar system with reduced mutual coupling between transmitters and receivers, according to embodiments of the present disclosure. Consistent with some embodiments, smart device 100 may be a smart AC configured for controlling the room condition (e.g., the temperature and/or the humidity) based on the human being condition (e.g., whether the human being is sleeping) determined by the Radar system with reduced mutual coupling between transmitters and receivers. It is contemplated that smart device 100 may also be other devices that can be adjusted automatically.

As illustrated in FIG. 1, smart device 100 may be equipped with a Radar system with reduced mutual coupling between transmitters and receivers 102 (also referred to as "Radar system 102" hereinafter) mounted to a body of smart device 100 via a mounting structure 108. Mounting structure 108 may be an electro-mechanical device installed or otherwise attached to the body of smart device 100. In some embodiments of the present disclosure, mounting structure 108 may use screws, adhesives, or another mounting mechanism. It is contemplated that the manners in which Radar system 102 can be equipped on smart device 100 are not limited by the example shown in FIG. 1 and may be modified depending on the types of Radar system and/or smart device 100 to achieve desirable radio detecting performance.

Consistent with some embodiments, Radar system 102 may be configured to capture data as smart device 100 performs its functions. For example, a transmitter of Radar system 102 may be configured to scan the surrounding environment. Radar system 102 measures distance to/movements of a target by illuminating the target with electromagnetic waves and measuring the reflected/scattered electromagnetic waves (e.g., the echo) with a receiver. In some embodiments, the electromagnetic waves used for Radar system 102 may be around 5.8 GHz and may be pulsed or continuous electromagnetic waves. In some embodiments of the present disclosure, Radar system 102 may capture information such as the position/speed of an object (e.g., the distance to the object), whether the object is a living thing (e.g., with breath and pulse), and the condition of the living thing (e.g., whether the living thing is sleeping) based on Doppler shift of the echo. The gathered information may be used for automatic controlling the functioning of smart device 100.

Figure 2:
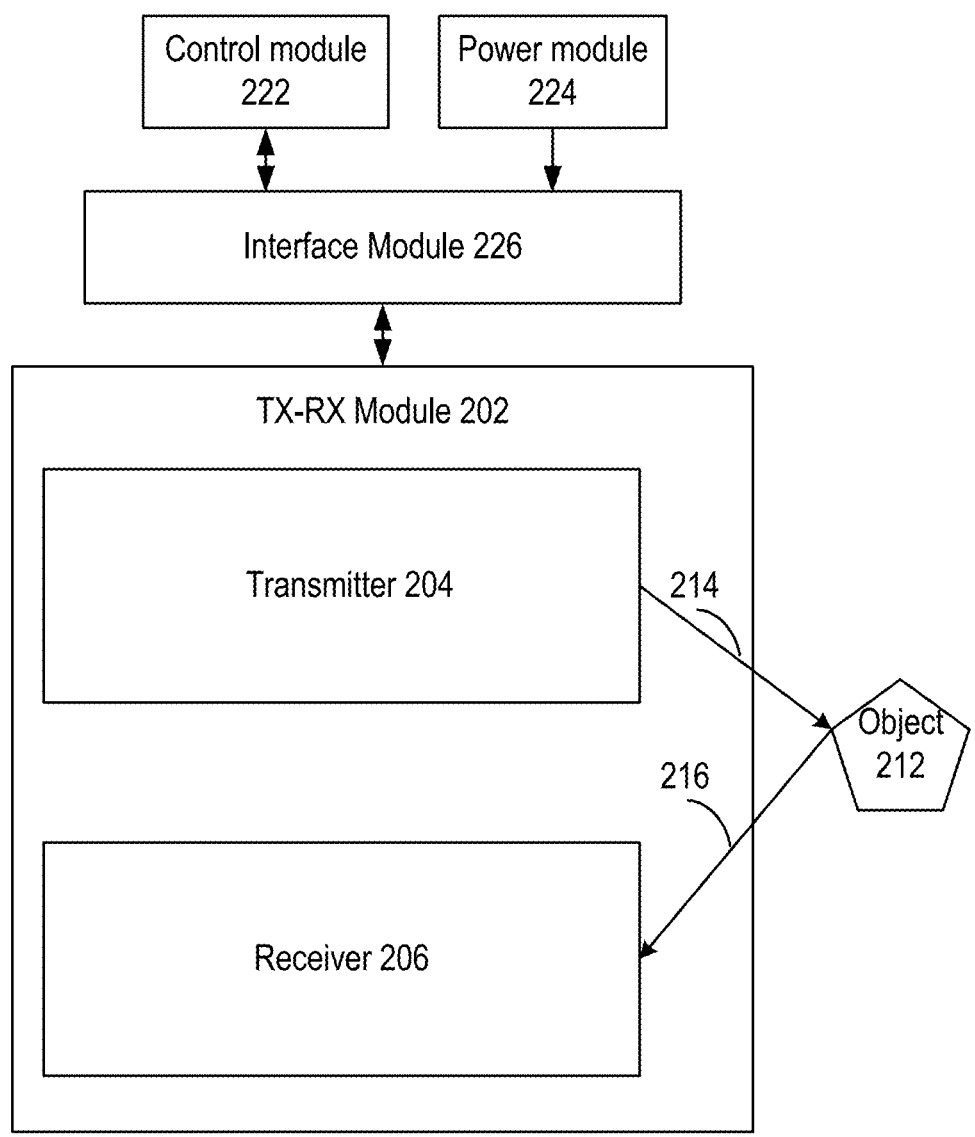
FIG. 2 illustrates a block diagram of an exemplary Radar system with reduced transmitter antenna and receiver antenna mutual coupling, according to embodiments of the present disclosure.

FIG. 2 illustrates a block diagram of an exemplary Radar system 200 with reduced mutual coupling between transmitters and receivers, according to embodiments of the present disclosure. As illustrated, Radar system 200 may include an integrated transmitter-receiver module 202 that includes a transmitter antenna 204 ("transmitter 204" hereinafter) and a receiver antenna 206 ("receiver 206" hereinafter) integrated into a single substrate. For example, integrated transmitter-receiver module 202 may include a printed circuit board (PCB) for providing mechanical base support and electrical interfaces that facilitate electrical communication amongst some/all parts in the integrated transmitter-receiver module 202 such as transmitter 204 and receiver 206. In some embodiments, transmitter 204 and receiver 206 may be microstrip/patch antennas etched on a first side of a dielectric substrate of the PCB and may be connected through a chip (e.g., a control module 222) for data processing and controlling. For better illustrative purposes, transmitter 204 and receiver 206 only include one transmitter antenna and/or receiver antenna respectively. It is understood that transmitter 204 and receiver 206 may include more than one transmitter antenna and/or receiver antenna respectively for achieving desirable detecting performance.

In some embodiments, each of transmitter 204 and receiver 206 may include radiation boundaries and non-radiation boundaries. Specifically, transmitter 204 may emit electromagnetic waves 214 to object 212 mostly through radiation boundaries of transmitter 204. Echo (e.g., returned electromagnetic waves 216 reflected by object 212) may be received by receiver 206 mostly through radiation boundaries of receiver 206. In some embodiments, object 212 within the range of detection may be made of a wide range of materials including, for example, non-metallic objects, rocks, rain, chemical compounds, aerosols, clouds and even living things.

Receiver 206 may be configured to detect returned electromagnetic wave 216 returned from object 212. Upon contact, electromagnetic waves can be reflected/scattered by object 212 via scatterings. Returned electromagnetic wave 216 may be in a same or different direction from electromagnetic wave 214. Returned electromagnetic wave 216 may have the same or different waveform (e.g., bandwidth and wavelength) as those in electromagnetic wave 214. Upon receiving returned electromagnetic wave 216 from the surrounding environment (e.g., reflected by object 212), receiver 206 may output electrical signals reflecting the property of returned electromagnetic wave 216 (e.g., bandwidth and wavelength). Based on the time for electromagnetic wave 214 to move forward and the time for returned electromagnetic wave 216 to move backward, and/or the Doppler shift between electromagnetic wave 214 and returned electromagnetic wave 216, position, speed, and/or other properties of object 212 may be detected.

In some embodiments, Radar system 200 may further include control module 222 for controlling the operation of and processing the data collected by integrated transmitter-receiver module 202, and a power module for providing power supply to the system. For instance, control module 222 may control transmitter 204 to produce electromagnetic wave 214 and receiver 206 to detect returned electromagnetic wave 216. In some embodiments, control module 222 may also implement data acquisition and analysis. For instance, control module 222 may collect digitalized signal information from a readout circuit (not shown) connected to receiver 206, detect the distance/speed/micro movement (e.g., vibration) of object 212 from Radar system 202 according to the travel time, frequency, and/or wavelength of electromagnetic waves, and determine the condition/property/characteristic of object(s) 212 based on the detecting result.

In some embodiments, control module 222 may include components (not shown) such as a processor, a memory, and a storage for performing various control functions. In some embodiments, these components of control module 222 may be implemented on a microchip, an integrated circuit (IC), for example, an application-specific integrated circuit (ASIC) or a field-programmable gate array (FPGA)) disposed on a printed circuit board (PCB).

Power module 224 may be configured to provide electrical power to modules such as integrated transmitter-receiver module 202 and/or control module 222. In some embodiments, power module 224 may include a DC power supply, an AC power supply, or any other power supply that can provide suitable voltage, current, and frequency to electrically power the modules.

In some embodiments, to facilitate the communication (e.g., transmission of control signals and/or obtained data) between and among the modules and/or with an outside device (e.g., a processing device and/or a manifestation device), Radar detection system 200 may further include an interface module 226 electrically connecting acquisition modules such as integrated transmitter-receiver module 202 to control module 222 for transmitting data. Integrated transmitter-receiver module 202 and/or control module 222 may also be electrically connected to power module 224 through interface module 226 for receiving electrical power. For example, instead of having interfaces for transmitting data and/or receiving electrical power on each module individually, modules such as integrated transmitter-receiver module 202 and/or control module 222 may share the interface circuits integrated on interface module 226. This can further free up the space occupied by those modules. Having interface module 226 can also increasing the robustness of data transmission. In some embodiments, interface module 226 may further be connected to an external connector of an outside device for further processing or manifesting the acquired data.

It is contemplated that in some embodiments, control module 222, power module 224, and/or interface module 226 may be positioned to predetermined positions of Radar system 200 by being affixed to the PCB of integrated transmitter-receiver 202. It is also contemplated that in some other embodiments, any of control module 222, power module 224, and/or interface module 226 may not be part of Radar system 200 or may be positioned at other locations, separate from Radar system 200 to perform the above-mentioned functions.

Figure 3:
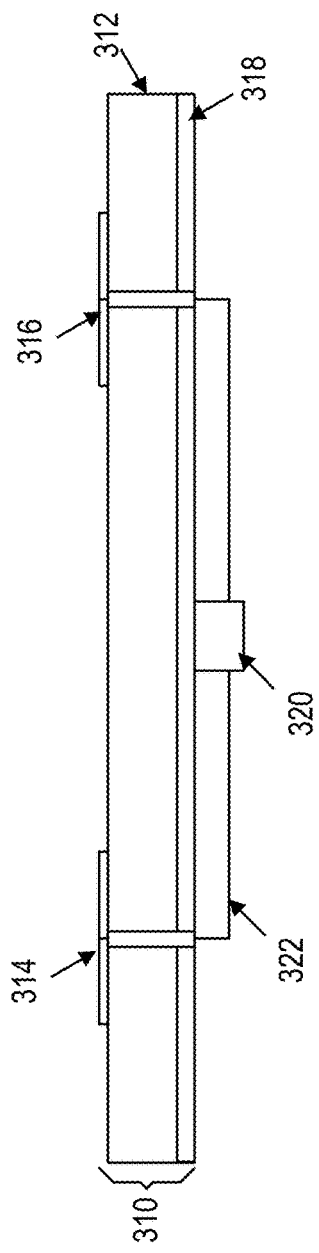
FIG. 3 illustrates a cross-sectional view of an exemplary side view of a Radar system with reduced transmitter antenna and receiver antenna mutual coupling, according to embodiments of the present disclosure.
Figure 3:
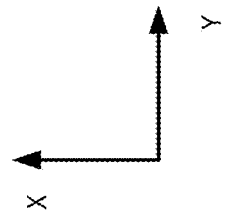

FIG. 3 illustrates a cross-sectional view of an exemplary side view of a Radar system 300, according to embodiments of the present disclosure. As described above, Radar system 300 may include integrated transmitter-receiver module 310 and control module 320 for controlling the functioning and processing data collected by integrated transmitter-receiver module 310. In some embodiments, integrated transmitter-receiver module 310 includes a dielectric substrate 312 for providing mechanical support and protection, transmitter antenna 314 and receiver antenna 316 disposed on a first side of dielectric substrate 312, and a ground plane 318 disposed to a second side of the dielectric substrate 312 opposite to the first side for grounding.

In some embodiments, transmitter antenna 314 and receiver antenna 316 may be microstrips antennas etched on the first side of dielectric substrate 312. Ground plane 318 may be a metal plane attached to the second side of dielectric substrate 312. In some embodiments, transmitter antenna 314 and receiver antenna 316 may be electrically connected to ground plane 318 through antenna feeders (not shown). Antenna feeders may pass through dielectric substrate 312 and ground plane 318 through probes in dielectric substrate 312. For example, the probes may be disposed within the area covered by transmitter antenna 314 and/or receiver antenna 316 (e.g., at the centroid of the area covered by transmitter antenna 314 and/or receiver antenna 316), through dielectric substrate 312, connecting to the corresponding antenna and ground plane 318. Thus, by passing through the probe, the antenna feeder can electrically connect (e.g., grounding) transmitter antenna 314 and/or receiver antenna 316 with ground plane 318.

In some embodiments, transmitter antenna 314 and receiver antenna 316 may be electrically connected to control module 320 through wires 322 (e.g., antenna feeders) disposed on the surface of ground plane 318. For example, wire 322 may be configured to transmit control signals (e.g., for controlling the emission and the reception of the electromagnetic waves) and/or transmit the data collected by receiver antenna 316 for processing.

FIG. 4A illustrates a top view of an exemplary conventional Radar system 400 and FIG. 4B illustrates a top view of a simulation result of mutual coupling between the transmitter antenna and the receiver antenna of Radar system 400, according to embodiments of the present disclosure. As illustrated in FIG. 4A, Radar system 400 includes a dielectric substrate 402, a transmitter antenna 404, a receiver antenna 406, a ground plane (not shown) disposed on the other side of dielectric substrate 402, a control module 408 (e.g., a chip disposed on the ground plane, shown in dash lines), and antenna feeders/wires connecting the components mentioned above. Transmitter antenna 404 and receiver antenna 406 are disposed such that the radiation boundaries (represented by dash lines) are perpendicular to the direct transmission path of the electromagnetic waves (e.g., perpendicular to the line connecting the centroids of transmitter antenna 404 and receiver antenna 406). Also, for the conciseness of wiring, control module 408 are normally disposed in the middle of transmitter antenna 404 and receiver antenna 406 (e.g., crossed by the line connecting the centroids of transmitter antenna 404 and receiver antenna 406). Accordingly, mutual coupling between transmitter antenna 404 and receiver antenna 406 (e.g., direct transmission of electromagnetic waves between transmitter antenna 404 and receiver antenna 406) would be severe as showing in FIG. 4B. because the radiation boundaries of transmitter antenna 404 and receiver antenna 406 are facing each other, and the control module 408 are in the middle of transmitter antenna 404 and receiver antenna 406.

To improve the mutual coupling issues between the transmitter antenna and the receiver antenna, the placement of the transmitter antenna and the receiver antenna are adjusted. FIG. 5A illustrates a top view of an exemplary Radar system 500 with reduced transmitter antenna and receiver antenna mutual coupling and FIG. 5B illustrates a top view of a simulation result of the direct radio transmission between the transmitter antenna and the receiver antenna of Radar system 500, according to embodiments of the present disclosure. Similar to Radar system 400, Radar system 500 may include a dielectric substrate 502, a transmitter antenna 504, a receiver antenna 506, a ground plane (not shown) disposed on the other side of dielectric substrate 502, a control module 508 (e.g., a chip disposed on the ground plane, illustrated in dash lines), and antenna feeders/wires connecting the components mentioned above.

Different from convention Radar systems, transmitter antenna 504 and receiver antenna 506 are disposed such that the radiation boundaries (represented by dash lines) are parallel to the direct transmission path of the electromagnetic waves (e.g., parallel to the line connecting the centroids of transmitter antenna 504 and receiver antenna 506). Also, instead of disposing the control module in the middle of transmitter antenna 504 and receiver antenna 506 (e.g., crossed by the line connecting the centroids of transmitter antenna 504 and receiver antenna 506), control module 508 is disposed outside the middle of transmitter antenna 504 and receiver antenna 506 (e.g., at different level in z axis from transmitter antenna 504 and receiver antenna 506). Accordingly, the transmission path for the direct transmission between transmitter antenna 504 and receiver antenna 506 would be extended, the transmission path continuity would be disrupted or cut off (e.g., as shown in FIG. 5B). Thus, the mutual coupling between transmitter antenna 504 and receiver antenna 506 would be reduced as a result.

Figure 6:
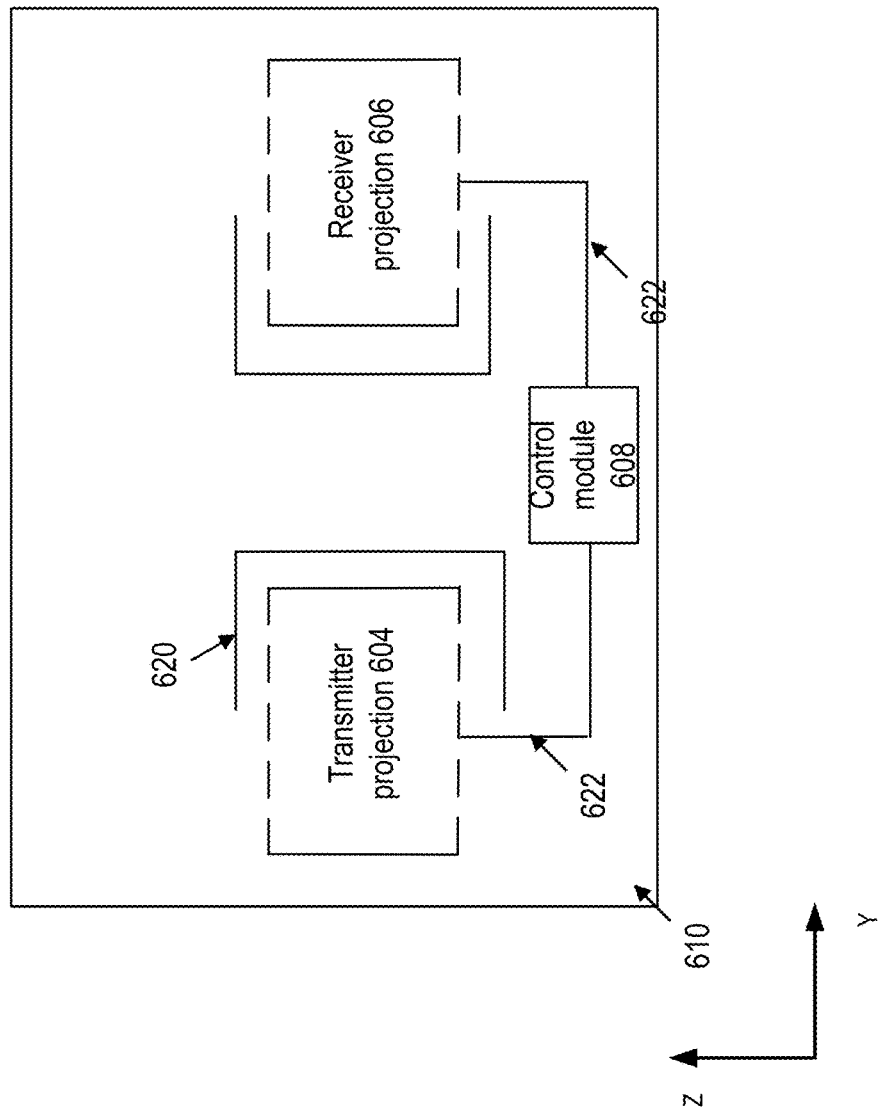
FIG. 6 illustrates a cross section view of a top view of ground plane of another exemplary Radar system with reduced transmitter antenna and receiver antenna mutual coupling, according to embodiments of the present disclosure.
Figure 7A:
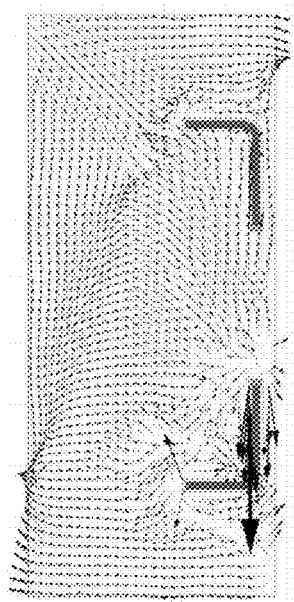
FIG. 7A illustrates simulation results of mutual coupling between the transmitter antenna and the receiver antenna on ground plane of a conventional Radar system.
Figure 7B:
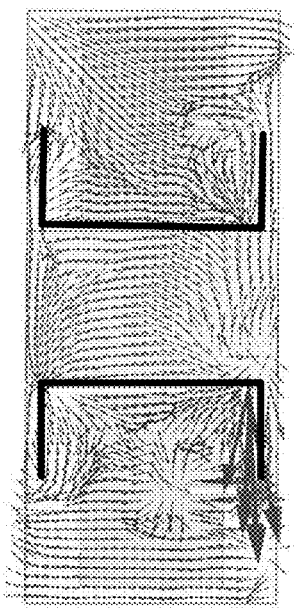
FIG. 7B illustrates simulation results of the direct radio transmission between the transmitter antenna and the receiver antenna on ground plane of the Radar system with reduced transmitter antenna and receiver antenna mutual coupling, according to embodiments of the present disclosure.

FIG. 6 illustrates a cross section view of a top view of a ground plane of another exemplary Radar system 600 with reduced transmitter antenna and receiver antenna mutual coupling, FIG. 7A illustrates simulation results of the direct radio transmission between the transmitter antenna and the receiver antenna on ground plane of a conventional Radar system and FIG. 7B, illustrates simulation results of the direct radio transmission between the transmitter antenna and the receiver antenna on the ground plane of Radar system 600 according to embodiments of the present disclosure. Similar to Radar system 400, Radio system 600 may also include a dielectric substrate (not shown), a transmitter antenna, a receiver antenna, a control module 608 (e.g., a chip), a ground plane 610 disposed on the other side of the dielectric substrate opposite to the side where the transmitter antenna and the receiver antenna are disposed, and antenna feeders/wires 622 connecting the components mentioned above.

As illustrated in FIG. 6, in addition to the difference that the transmitter antenna and the receiver antenna positioning is different from a conventional Radar system (e.g., Radar system 400), Radar system 600 is also different from a conventional Radar system such that ground plane 610 includes at least one groove 620, separating a vertical projection of transmitter antenna 602 ("projection 602" hereinafter), and a vertical projection of the receiver antenna 604 ("projection 604" hereinafter). The dash lines in projections 602 and 604 represent the vertical projection of radiation boundaries of the transmitter antenna and the receiver antenna on ground plane 610.

In some embodiments, grooves 620 may be a U shape gap surrounding the vertical projections of non-radiation boundaries of the transmitter antenna and/or the receiver antenna on ground plane 610, and at least a portion of vertical projection of radiation boundaries of the transmitter antenna and/or the receiver antenna on ground plane 610. For example, the bottom edge of the U shape gap could be longer than the length of the non-radiation boundaries of the transmitter antenna and the receiver antenna. In some embodiments, in order to not interfere with the radiation characteristic of the transmitter antenna and the receiver antenna, the side edges of the U shape gap (e.g., the edge of the U shape gap facing vertical projection of radiation boundaries of the transmitter antenna and/or the receiver antenna on ground plane 610) could be less than ½ of the length of the radiation boundaries of the transmitter antenna and the receiver antenna. In other words, grooves 620 may surround less than ½ of the length of the vertical projection of the radiation boundary in the corresponding projections 602 and 604 on the ground plane.

As the result, as shown in FIGS. 7A and 7B, according to the simulation result, the surface/space wave transmission on ground plane can be significantly reduced because a large portion of the transmission path of the surface/space wave on ground plane 610 are cut off (e.g., the surface/space wave could only transmit horizontally (e.g., along y axis) through a narrow path closing to the edge of ground plane 610). Standing wave effect (e.g., standing waves can be formed on ground plane 610) may show on ground plane 610 and may help to cancel out a large portion of the mutual coupling.

In some embodiments, grooves 620 may be fabricated (e.g., etched or cut) on ground plane 610. For example, grooves 620 may be etched through ground plane 610 (e.g., pass through from one side to the opposite side of ground plane 610) at the time ground plane 610 was manufactured or at a time point after ground plane 610 is formed. As ground plane 610 (e.g., the metal plane disposed on one side of the dielectric substrate) is disconnected at grooves 620 (e.g., the portion covered by grooves 620 are curved out), the current on ground plane 610 can not be transmitted through grooves 620. Accordingly, standing waves may be formed to further suppress the mutual coupling between the transmitter antenna and the receiver antenna.

It is understood that although grooves 620 in the present example includes a pair of grooves surrounding projections 602 and 604 respectively, it would be obvious to one skilled in the art that groove 620 may include only one groove disposed on ground plane 610 that surrounds only one of projections 602 or 604, or groove 620 may include more than two grooves disposed on ground plane 610 surrounding any or both of projections 602 and 604. Also, the shape of groove 620 is not limited to the U shape and can be in any suitable shape such as an arc shape, freeform, etc., depending on the shape of the transmitter antenna and the receiver antenna, so long as groove 620 surrounds the corresponding vertical projection of non-radiation boundaries of the transmitter antenna or the receiver antenna on ground plane 610, and at least a portion of (e.g., less than ½ the length of) vertical projection of radiation boundaries of the transmitter antenna and the receiver antenna on ground plane 610.

Figure 8:
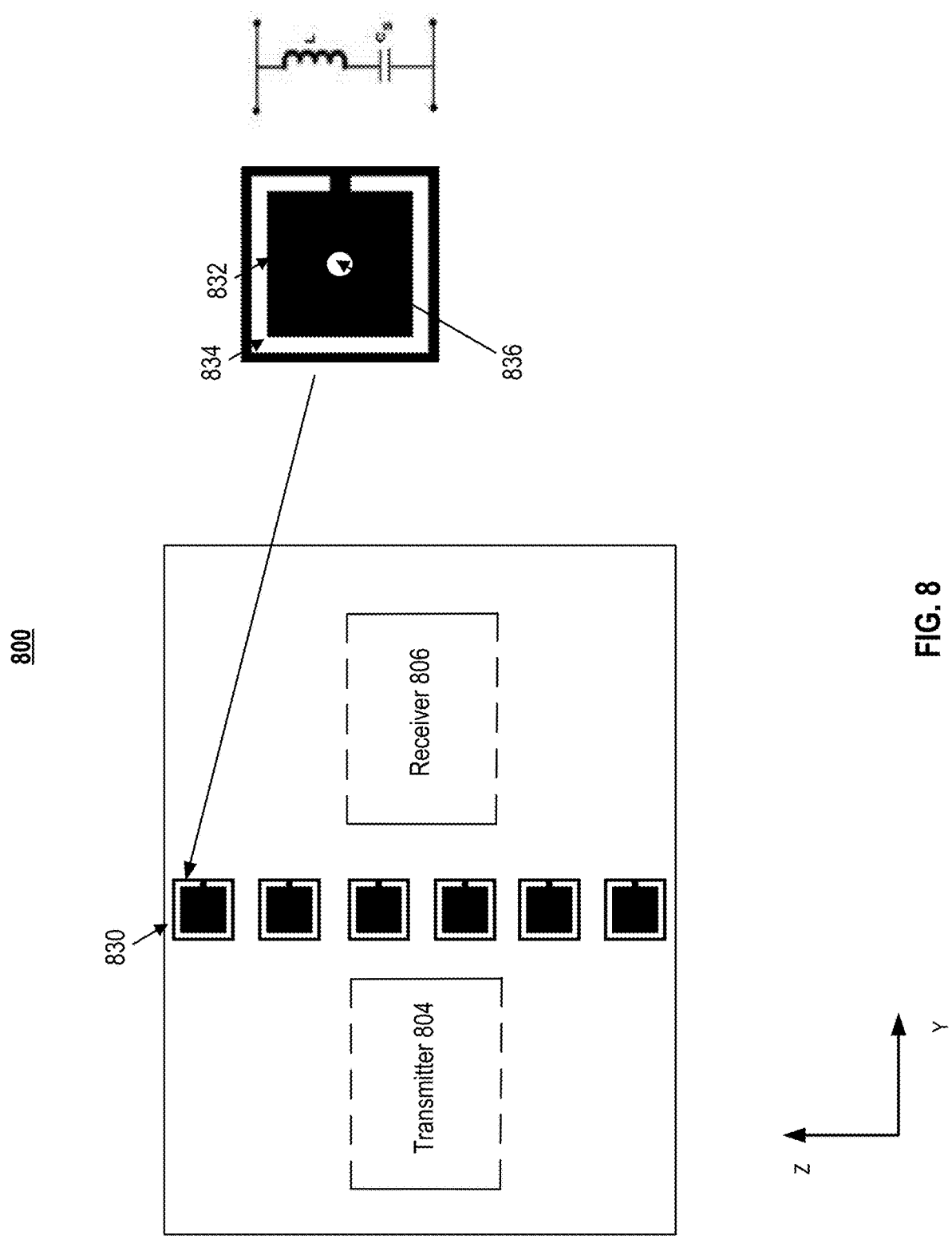
FIG. 8 illustrates a top view of a further exemplary Radar system with reduced transmitter antenna and receiver antenna mutual coupling, according to embodiments of the present disclosure.

FIG. 8 illustrates a top view of a further exemplary Radar system 800 with reduced transmitter antenna and receiver antenna mutual coupling, according to embodiments of the present disclosure. Similar to Radar system 400, Radio system 800 may include a dielectric substrate 802, a transmitter antenna 804, a receiver antenna 806, a control module (e.g., a chip) (not shown), a ground plane (not shown) disposed on the other side of dielectric substrate 802 opposite to the side where transmitter antenna 804 and receiver antenna 806 are disposed, and wires/antenna feeders (not shown) connecting the components mentioned above.

As illustrated in FIG. 8, in addition to the transmitter antenna and the receiver antenna positioning differences comparing to a conventional Radar system (e.g., Radar system 400), Radar system 800 is also different from the conventional Radar system that Radar system 800 includes more than one frequency selective structure (FSS) unit ("FSS unit 830" hereinafter) separating transmitter antenna 804 and receiver antenna 806, disposed on the same side (e.g., the first side) of dielectric substrate 802 with transmitter antenna 804 and receiver antenna 806 (e.g., substantially co-planar to transmitter antenna 804 and receiver antenna 806). It is understood that more than one FSS unit 830 may be aligned in any suitable manner such that more than FSS unit 830 separate transmitter antenna 804 and receiver antenna 806 on the first side of dielectric substrate 802. For example, as illustrated in FIG. 8, more than one FSS unit 830 may be disposed periodically cross the first side of the dielectric substrate where transmitter antenna 804 and receiver antenna 806 are disposed (e.g., substantially from one side of the first side of the dielectric substrate to the opposite side of the first side dielectric substrate), substantially perpendicular to the radiation boundaries of the transmitter antenna and the receiver antenna. In some other embodiments, more than one FSS unit 830 may be disposed substantially parallel to the radiation boundaries of the transmitter antenna and the receiver antenna. In some further embodiments, more than one FSS unit 830 may be disposed in multiple rows and/or lines (e.g., arranged in two lines cross the surface of the dielectric substrate) separating transmitter antenna 804 and receiver antenna 806. In some embodiments, the arrangement of more than one FSS unit 830 may be determined by optimizing the space utilization on the first side of the dielectric substrate where transmitter antenna 804 and receiver antenna 806 are disposed, so long as more than one FSS unit 830 are disposed in the middle of transmitter antenna 804 and receiver antenna 806 separating transmitter antenna 804 and receiver antenna 806 accordingly.

In some embodiments, each FSS unit 830 includes a resonant circuit (e.g., an inductor and a capacitor connected in series) configured to suppress an operating frequency of transmitter antenna 804 and receiver antenna 806 by setting a central frequency of the band gap of each FSS unit 830 to substantially equal to the operating frequency of transmitter antenna 804 and receiver antenna 806. For example, as shown in FIG. 8, each of FSS unit 830 may include a square patch 832 (e.g., a planar conductor in substantially square shape, represented by the black square) and a square loop 834 surrounding square patch 832 (e.g., a planar conductor substantially in square shape, represented by the white strip surrounding the black square). It is understood that for illustration purpose, each FSS unit 830 in the disclosed embodiments are described in substantially square shapes (e.g., consists of square patch 832 and square loop 834). The shape of the pair of each FSS unit 830 as well as all the FSS unit disclosed herein (e.g., the shape of the pair of inductor and capacitor) are not limited to the shape illustrated in the disclosed embodiments (e.g., in a square shape). The pair of inductor and capacitor can be in any suitable shape such as substantially a circle shape, substantially a rectangle shape, substantially a triangle shape, substantially a hexagon shape, etc., so long as the pair of inductor and capacitor can match each other and can form the equivalent inductor and capacitor connected in series with proper parameters.

In some embodiments, square loop 834 may be in a C shape with a gap in one of the edges. In some embodiments, square patch 832 may include a probe 836 (e.g., in the center of square patch 832, pass through dielectric substrate 802 in x axis) to electrically connect square patch 832 to the ground plane. When functioning, each FSS unit 830 may be equivalent to a LC circuit model where the equivalent inductor L results from square loop 834 and the equivalent capacitor C results from square patch 832 connecting to the ground plane. Accordingly, the equivalent inductor L and the equivalent capacitor C of each FSS unit 830 may be determined by the size of each FSS unit 830 (e.g., the size of square loop 834 and square patch 832 respectively).

In some embodiments, each FSS unit 830 are designed such that a central frequency of the band gap of each FSS unit 830 substantially equals to the operating frequency (e.g., substantially 5.8 GHz) of transmitter antenna 804 and receiver antenna 806. For example, the impedance Z and the central frequency of the band gap $\omega_0$ of the equivalent LC circuit may be calculated according to equations (1) and (2):

$$Z = \frac{j\omega L}{1 - \omega^2 LC} \quad (1)$$

$$\omega_0 = \frac{1}{\sqrt{LC}} \quad (2)$$

By adjusting the size of ach FSS unit 830 (e.g., adjusting the size of square loop 834 and square patch 832 respectively), the central frequency of the band gap $\omega_0$ of each FSS unit 830 may be designed to be substantially around the operating frequency of transmitter antenna 804 and receiver antenna 806. Accordingly, when functioning, the mutual coupling between transmitter antenna 804 and receiver antenna 806 (e.g., mostly through the surface/space wave transmission around the operating frequency on the surface of dielectric substrate 802) would be suppressed. The mutual coupling may be mostly absorbed and transformed into other form of energy such as heat or other mode of electromagnetic waves different from the operating frequency of transmitter antenna 804 and receiver antenna 806.

In some embodiments, square patch 832 and square loop 834 can be made up of the same kind of material (e.g., the same kind of metal or ally') as transmitter antenna 804 and receiver antenna 806 for ease of fabrication and may be etched at the same time when transmitter antenna 804 and receiver antenna 806 are etched on the first side of dielectric substrate 802. In some other embodiments, square patch 832 and square loop 834 may be made up of different kind of materials than transmitter antenna 804 and receiver antenna 806 and may be etched at a different time then transmitter antenna 804 and receiver antenna 806 are etched on the first side of dielectric substrate 802.

Figure 9:
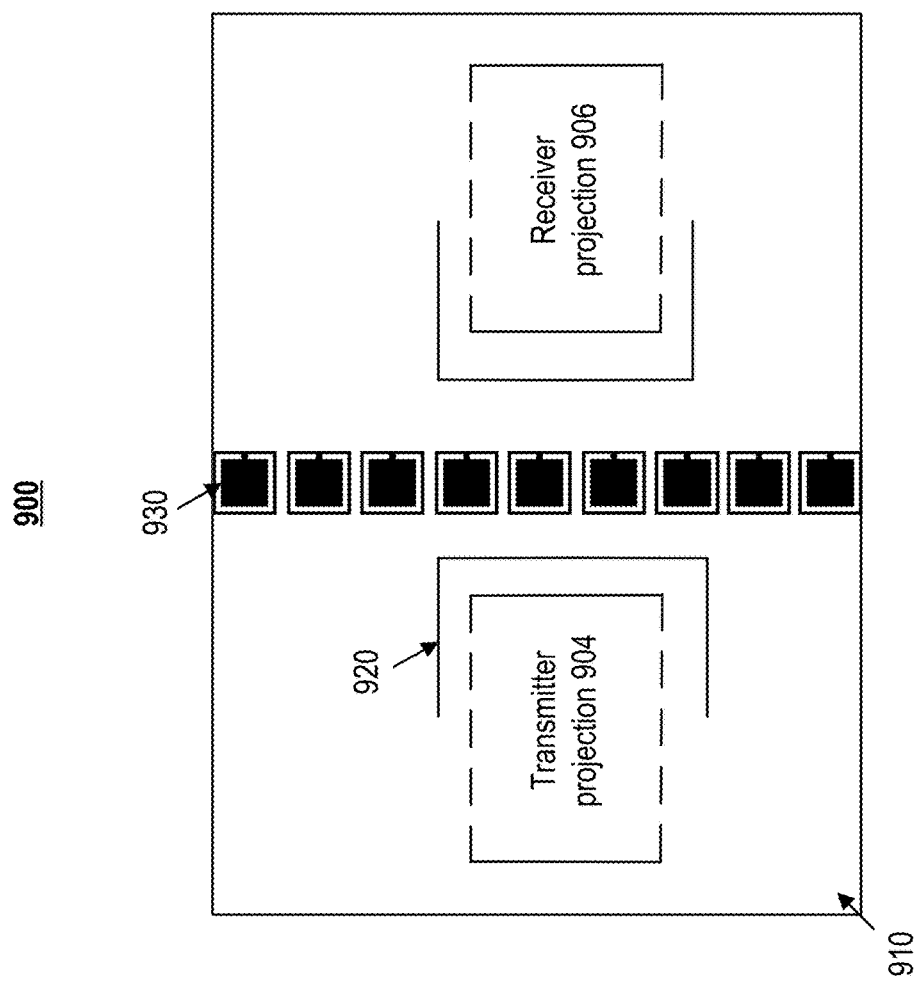
FIG. 9 illustrates a top view of still an exemplary Radar system 900 with reduced transmitter antenna and receiver antenna mutual coupling, according to embodiments of the present disclosure.

FIG. 9 illustrates a top view of still an exemplary Radar system 900 with reduced transmitter antenna and receiver antenna mutual coupling, according to embodiments of the present disclosure. Similar to Radar system 400, Radio system 900 may also include a dielectric substrate 910, a transmitter antenna 904, a receiver antenna 906, a control module (e.g., a chip, not shown), a ground plane (not shown) disposed on the other side of dielectric substrate 910 opposite to the side where transmitter antenna 904 and receiver antenna 906 are disposed, and antenna feeders/wires (not shown) connecting the components mentioned above.

As illustrated in FIG. 9, Radar system 900 is a combination of the three mechanisms disclosed in previous embodiments. Specifically, in Radar system 900, transmitter antenna 904 and receiver antenna 906 may be disposed manner in a manner similar to Radar system 500 as disclosed along with FIG. 5, where the radiation boundaries of transmitter antenna 904 and receiver antenna 906 are substantially parallel to a line connecting centroids of the transmitter antenna and the receiver antenna. Radar system 900 may also include at least one groove 920 disposed on the ground plane, separating the vertical projection of transmitter antenna 904 and receiver antenna 906 on the ground plane in a manner similar to Radar system 600 as disclosed along with FIG. 6. Further, Radar system 900 may include more than one FSS unit 930 disposed on the same side of transmitter antenna 904 and receiver antenna 906 in a manner similar to Radar system 800 as along with FIG. 8. The detail of how transmitter antenna 904 and receiver antenna 906, at least one groove 920, and more than one FSS unit 930 are designed and disposed will not be repeated for ease of illustration.

By combining the above-mentioned mechanisms, the interference caused by mutual coupling between transmitter antenna 904 and receiver antenna 906 may be reduced to 1/500 comparing to conventional Radar systems with similar parameters. Accordingly, the sensitivity of the Radar system, the minimum detection distance (e.g., the resolution of the detecting result), and the size of the packaging may be greatly improved.

Figure 10:
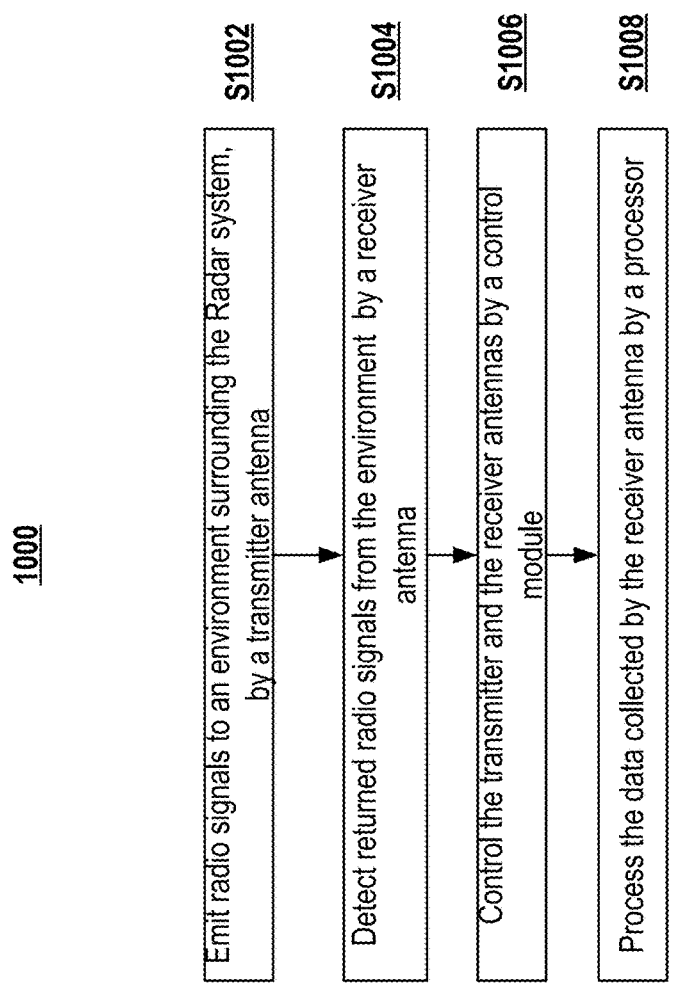
FIG. 10 shows a flow chart of an exemplary radio detection method performed by a Radar system with reduced transmitter antenna and receiver antenna mutual coupling, according to embodiments of the present disclosure.

FIG. 10 shows a flow chart of an exemplary radio detection method performed by a Radar system with reduced mutual coupling between the transmitter and the receiver, according to embodiments of the present disclosure. In some embodiments, method 1000 may be performed by Radar systems 102, 200, 300, 500, 600, 800, or 900. In some embodiments, method 1000 may include steps S1002-S1006. It is to be appreciated that some of the steps may be optional. Further, some of the steps may be performed simultaneously, or in a different order than that shown in FIG. 10.

In step S1002, electromagnetic waves (e.g., radio waves) are emitted by an integrated transmitter-receiver module (e.g., a transmitter antenna of the integrated transmitter-receiver module) to an environment surrounding the Radar system (e.g., Radar systems 102, 200, 300, 500, 600, 800, or 900).

In step S1004, electromagnetic waves returned from the environment (e.g., reflected by an object) are detected by the integrated transmitter-receiver module (e.g., a receiver antenna of the integrated transmitter-receiver module).

In step S1006, the integrated transmitter-receiver module may be controlled by a control module (e.g., control module 320) for emitting and detecting the electromagnetic waves. For example, the transmitter antenna may be controlled to emit electromagnetic waves intermittently or when needed to save energy.

In some embodiments, method 1000 may further include step S1008 where the data collected by the integrated transmitter-receiver module may be processed by a processor (e.g., modulation, gain adjustment, etc.).

As described above, to perform method 1000, the transmitter antenna and the receiver antenna of the Radio system may be disposed such that the radiation boundaries (represented by dash lines) are parallel to the direct transmission path of the electromagnetic waves (e.g., parallel to the line connecting the centroids of the transmitter antenna and the receiver antenna). Also, instead of disposing the control module in the middle of the transmitter antenna and the receiver antenna (e.g., crossed by the line connecting the centroids of the transmitter antenna and the receiver antenna), the control module may be disposed outside the middle of the transmitter antenna and the receiver antenna as shown in FIG. 5A.

Also, as described above, when performing method 1000, the transmitter antenna and the receiver antenna of the Radio system may be separated by more than one of frequency-selective surface (FSS) units, configured to reduce mutual coupling between the transmitter antenna and the receiver antenna by suppressing an operating frequency of the transmitter antenna and the receiver antenna. The more than one of FSS units are substantially co-planar to the transmitter antenna and the receiver antenna on the first side of the dielectric substrate where the transmitter antenna and the receiver antenna are disposed.

Further, as described above, the Radio system performing method 1000 may include a ground plane disposed on a second side of the dielectric substrate, opposite to the first side, operatively connected to the transmitter antenna, the receiver antenna, and each of the FSS units through probes. The ground plane may include at least one groove partially surrounds vertical projections of at least one of the transmitter antenna or the receiver antenna on the ground plane, separating the vertical projections of the transmitter antenna and the receiver antenna on the ground plane. In some embodiments, the groove surrounds less than ½ of the length of the vertical projections of the radiation boundary of the corresponding transmitter antenna or receiver antenna on the ground plane.

According to one aspect of the present disclosure, a Radio Detection and Ranging (Radar) system with reduced mutual coupling between transmitters and receivers is disclosed. The radar system includes a transmitter antenna disposed on a first side of the dielectric substrate and a receiver antenna disposed on the same side of the dielectric substrate. The radiation boundaries of the transmitter antenna and the receiver antenna are substantially parallel to a line connecting centroids of the transmitter antenna and the receiver antenna. The radar system also includes a ground plane disposed on a second side of the dielectric substrate, opposite to the first side, operatively connected to the transmitter antenna and the receiver antenna through probes. The ground plane includes at least one groove, separating vertical projections of the transmitter antenna and the receiver antenna on the ground plane.

In some embodiments, the groove partially surrounds the vertical projection of at least one of the transmitter antenna or the receiver antenna on the ground plane.

In some embodiments, the groove surrounds less than ½ of the length of the vertical projection of the radiation boundary of the corresponding transmitter antenna or receiver antenna on the ground plane.

In some embodiments, the dielectric substrate further includes a plurality of frequency-selective surface (FSS)

units separating the transmitter antenna and the receiver antenna, configured to reduce mutual coupling between the transmitter antenna and the receiver antenna by suppressing an operating frequency of the transmitter antenna and the receiver antenna. The plurality of FSS units are substantially co-planar to the transmitter antenna and the receiver antenna on the first side of the dielectric substrate In some embodiments, each of the plurality of FSS units includes a pair of planar inductor and planar conductor, connected in series.

In some embodiments, the planar inductor and the planar conductor are in substantially square shapes, wherein a band gap of the plurality of FSS units is determined by the size of each FSS unit.

In some embodiments, a central frequency of the band gap substantially equals to the operating frequency of the transmitter antenna and the receiver antenna.

In some embodiments, the plurality of FSS units are disposed periodically cross the first side of the dielectric substrate, substantially perpendicular to the radiation boundaries of the transmitter antenna and the receiver antenna.

In some embodiments, each of the plurality of FSS is connected to a probe at substantially the center of the FSS unit, wherein each FSS units is conductively connected to the ground plane through the corresponding probe.

According to a further aspect of the present disclosure, an apparatus for radio detection with reduced mutual coupling between transmitters and receivers is disclosed. The apparatus includes a dielectric substrate. The dielectric substrate includes a transmitter antenna disposed on a first side of the dielectric substrate. The dielectric substrate also includes a receiver antenna disposed on the same side of the dielectric substrate, wherein the radiation boundaries of the transmitter antenna and the receiver antenna are substantially parallel to a line connecting centroids of the transmitter antenna and the receiver antenna. The dielectric substrate further includes a plurality of frequency-selective surface (FSS) units separating the transmitter antenna and the receiver antenna, configured to reduce mutual coupling between the transmitter antenna and the receiver antenna by suppressing an operating frequency of the transmitter antenna and the receiver antenna. The plurality of FSS units are substantially co-planar to the transmitter antenna and the receiver antenna on the first side of the dielectric substrate. The apparatus also includes a ground plane disposed on a second side of the dielectric substrate, opposite to the first side, operatively connected to the transmitter antenna and the receiver antenna through probes.

In some embodiments, each of the plurality of FSS comprises a pair of planar inductor and planar conductor, connected in series.

In some embodiments, the planar inductor and the planar conductor are in substantially square shapes, wherein a band gap of the plurality of FSS units are determined by the size of each FSS unit.

In some embodiments, the central frequency of the band gap substantially equals to the operating frequency of the transmitter antenna and the receiver antenna.

In some embodiments, the plurality of FSS units are disposed periodically cross the first side of the dielectric substrate, substantially perpendicular to the radiation boundaries of the transmitter antenna and the receiver antenna.

In some embodiments, each of the plurality of FSS units is connected to a probe at substantially the center of the FSS unit, wherein each FSS unit is conductively connected to the ground plane through the corresponding probe.

In some embodiments, the ground plane further comprises at least one groove, separating vertical projections of the transmitter antenna and the receiver antenna on the ground plane.

In some embodiments, the groove partially surrounds the vertical projection of at least one of the transmitter antenna or the receiver antenna on the ground plane.

In some embodiments, the groove surrounds less than ½ of the length of the vertical projection of the radiation boundary of the corresponding transmitter antenna or receiver antenna on the ground plane.

According to still another aspect of the present disclosure, a method for radio detection using a Radar system with reduced mutual coupling between transmitters and receivers is disclosed. The method includes emitting radio signals to an environment surrounding the Radar system, by a transmitter antenna disposed on a first side of a dielectric substrate. The method also includes detecting, by a receiver antenna disposed on the same side of the dielectric substrate, returned radio signals from the environment. The radiation boundaries of the transmitter antenna and the receiver antenna are substantially parallel to a line connecting centroids of the transmitter antenna and the receiver antenna. The transmitter antenna and the receiver antenna are separated by a plurality of frequency-selective surface (FSS) units, configured to reduce mutual coupling between the transmitter antenna and the receiver antenna by suppressing an operating frequency of the transmitter antenna and the receiver antenna, and wherein the plurality of FSS units are substantially co-planar to the transmitter antenna and the receiver antenna on the first side of the dielectric substrate.

In some embodiments, the Radar system includes a ground plane disposed on a second side of the dielectric substrate, opposite to the first side, operatively connected to the transmitter antenna, the receiver antenna, and each of the plurality of FSS units through probes. The ground plane includes at least one groove partially surrounds vertical projections of at least one of the transmitter antenna or the receiver antenna on the ground plane, separating the vertical projections of the transmitter antenna and the receiver antenna on the ground plane. The groove surrounds less than ½ of the length of the vertical projections of the radiation boundary of the corresponding transmitter antenna or receiver antenna on the ground plane.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. It is intended that the specification and examples be considered as exemplary only, with a true scope being indicated by the following claims and their equivalents.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

The invention claimed is:

1. A Radio Detection and Ranging (Radar) system with reduced transmitter antenna and receiver antenna mutual coupling, comprising:
a dielectric substrate comprises:
a transmitter antenna disposed on a first side of the dielectric substrate;
a receiver antenna disposed on the first side of the dielectric substrate,
wherein radiation boundaries of the transmitter antenna and the receiver antenna are substantially parallel to a line connecting centroids of the transmitter antenna and the receiver antenna; and
a plurality of frequency-selective surface (FSS) units separating the transmitter antenna and the receiver antenna, wherein each of the FSS units comprises a C-shaped square loop having a gap in one edge of edges of the C-shaped square loop; and
a ground plane disposed on a second side of the dielectric substrate, opposite to the first side, operatively connected to the transmitter antenna and the receiver antenna through probes,
wherein the ground plane comprises at least one groove, separating vertical projections of the transmitter antenna and the receiver antenna on the ground plane.

2. The system of claim 1, wherein the groove partially surrounds the vertical projection of at least one of the transmitter antenna or the receiver antenna on the ground plane.

3. The system of claim 2, wherein the groove surrounds less than ½ of a length of the vertical projection of the radiation boundary of the corresponding transmitter antenna or receiver antenna on the ground plane.

4. The system of claim 1, wherein the plurality of FSS units are substantially co-planar to the transmitter antenna and the receiver antenna on the first side of the dielectric substrate.

5. The system of claim 4, wherein each of the plurality of FSS units comprises a pair of planar inductor and planar conductor, connected in series.

6. The system of claim 5, wherein the planar inductor and the planar conductor are in substantially square shapes, wherein a band gap of the plurality of FSS units is determined by a size of each FSS unit.

7. The system of claim 6, wherein a central frequency of the band gap substantially equals to an operating frequency of the transmitter antenna and the receiver antenna.

8. The system of claim 4, wherein the plurality of FSS units are disposed periodically cross the first side of the dielectric substrate, substantially perpendicular to the radiation boundaries of the transmitter antenna and the receiver antenna.

9. The system of claim 4, wherein each of the plurality of FSS is connected to a probe at substantially a center of the FSS unit, wherein each FSS units is conductively connected to the ground plane through the corresponding probe.

10. An apparatus for radio detection with reduced transmitter antenna and receiver antenna mutual coupling, comprising:
a dielectric substrate comprises:
a transmitter antenna disposed on a first side of the dielectric substrate;
a receiver antenna disposed on the first side of the dielectric substrate,
wherein radiation boundaries of the transmitter antenna and the receiver antenna are substantially parallel to a line connecting centroids of the transmitter antenna and the receiver antenna; and
a plurality of frequency-selective surface (FSS) units separating the transmitter antenna and the receiver antenna, configured to reduce mutual coupling between the transmitter antenna and the receiver antenna by suppressing an operating frequency of the transmitter antenna and the receiver antenna, wherein the plurality of FSS units are substantially co-planar to the transmitter antenna and the receiver antenna on the first side of the dielectric substrate and wherein each of the FSS units comprises a C-shaped square loop having a gap in one edge of edges of the C-shaped square loop; and
a ground plane disposed on a second side of the dielectric substrate, opposite to the first side, operatively connected to the transmitter antenna and the receiver antenna through probes.

11. The apparatus of claim 10, wherein each of the plurality of FSS comprises a pair of planar inductor and planar conductor, connected in series.

12. The apparatus of claim 11, wherein the planar inductor and the planar conductor are in substantially square shapes, wherein a band gap of the plurality of FSS units are determined by a size of each FSS unit.

13. The apparatus of claim 12, wherein a central frequency of the band gap substantially equals to the operating frequency of the transmitter antenna and the receiver antenna.

14. The apparatus of claim 13, wherein the plurality of FSS units are disposed periodically cross the first side of the dielectric substrate, substantially perpendicular to the radiation boundaries of the transmitter antenna and the receiver antenna.

15. The apparatus of claim 10, wherein each of the plurality of FSS units is connected to a probe at substantially a center of the FSS unit, wherein each FSS unit is conductively connected to the ground plane through the corresponding probe.

16. The apparatus of claim 10, wherein the ground plane further comprises at least one groove, separating vertical projections of the transmitter antenna and the receiver antenna on the ground plane.

17. The apparatus of claim 16, wherein the groove partially surrounds the vertical projection of at least one of the transmitter antenna or the receiver antenna on the ground plane.

18. The apparatus of claim 17, wherein the groove surrounds less than ½ of a length of the vertical projection of the radiation boundary of the corresponding transmitter antenna or receiver antenna on the ground plane.

19. A method for radio detection using a Radar system with reduced transmitter antenna and receiver antenna mutual coupling comprises:
  emitting radio signals to an environment surrounding the Radar system, by a transmitter antenna disposed on a first side of a dielectric substrate; and
  detecting, by a receiver antenna disposed on a same side of the dielectric substrate, returned radio signals from the environment, wherein radiation boundaries of the transmitter antenna and the receiver antenna are substantially parallel to a line connecting centroids of the transmitter antenna and the receiver antenna,
  wherein the transmitter antenna and the receiver antenna are separated by a plurality of frequency-selective surface (FSS) units, configured to reduce mutual coupling between the transmitter antenna and the receiver antenna by suppressing an operating frequency of the transmitter antenna and the receiver antenna, and wherein the plurality of FSS units are substantially co-planar to the transmitter antenna and the receiver antenna on the first side of the dielectric substrate and wherein each of the FSS units comprises a C-shaped square loop having a gap in one edge of edges of the C-shaped square loop.

20. The method of claim 19, wherein the Radar system further comprises a ground plane disposed on a second side of the dielectric substrate, opposite to the first side, operatively connected to the transmitter antenna, the receiver antenna, and each of the plurality of FSS units through probes, wherein the ground plane comprises at least one groove partially surrounds vertical projections of at least one of the transmitter antenna or the receiver antenna on the ground plane, separating the vertical projections of the transmitter antenna and the receiver antenna on the ground plane, and wherein the groove surrounds less than ½ of a length of the vertical projections of the radiation boundary of the corresponding transmitter antenna or receiver antenna on the ground plane.

* * * * *